United States Patent [19]
Katoh

[11] Patent Number: 5,471,569
[45] Date of Patent: Nov. 28, 1995

[54] RETRIEVAL SPACE DETERMINATION SYSTEM FOR THREE-DIMENSIONALLY SHAPED PARTS IN A CAD SYSTEM

[75] Inventor: Akira Katoh, Kawasaki, Japan

[73] Assignee: Fujitsu Limited, Kawasaki, Japan

[21] Appl. No.: 953,027

[22] Filed: Sep. 29, 1992

[30] Foreign Application Priority Data

Oct. 2, 1991 [JP] Japan ................................. 3-255483

[51] Int. Cl.$^6$ ................................................. G06T 15/30
[52] U.S. Cl. ........................................ 395/134; 395/119
[58] Field of Search ................................. 395/119, 134, 395/122, 133, 142

[56] References Cited

U.S. PATENT DOCUMENTS

| | | | |
|---|---|---|---|
| 4,835,722 | 5/1989 | Clarke et al. | 364/720 |
| 4,994,989 | 2/1991 | Usami et al. | |
| 5,249,264 | 9/1993 | Matsumoto | 395/134 |

Primary Examiner—Heather R. Herndon
Assistant Examiner—Michael Smith
Attorney, Agent, or Firm—Staas & Halsey

[57] ABSTRACT

The present invention relates to a retrieval space determination system for three-dimensionally shaped parts in a computer aided design (CAD) system. An input unit inputs coordinates of two points defining one side of a retrieval space displayed on a display screen and inputs the depth of the retrieval spaced based on that side. A file stores three-dimensional shape data. A circumscribing sphere creating unit reads a selected three-dimensionally shaped part from the file storing the three-dimensional shape data and creates a circumscribing sphere for the selected three-dimensional shape part in accordance with the coordinate data of the part. The coordinate conversion unit converts center coordinates of the circumscribing sphere, created by the circumscribing sphere creating unit, into coordinates of the retrieval space input from the input unit. An in/out decision units compares the center coordinates of the circumscribing sphere converted into coordinates of the retrieval space, the radius of the circumscribing sphere, and the coordinates of the sides of the retrieval space and, based on this data, determines whether the circumscribing sphere is completely included within the retrieval space or is only partially included within the retrieval space.

2 Claims, 9 Drawing Sheets

COORDINATE SYSTEM OF A

RETRIEVAL SPACE DETERMINATION SYSTEM FOR THREE-DIMENSIONALLY SHAPED PARTS IN A CAD SYSTEM

BACKGROUND OF THE INVENTION

1. Field of the Invention

The present invention relates to a retrieval space determination system for three-dimensionally shaped parts in a computer aided design (CAD) system. More specifically, the present invention relates to a retrieval system for determining the location of three-dimensionally shaped parts which enables high speed determination of whether a part in question is completely included within a predetermined area in the display, i.e., is included completely in a "retrieval space", or is only partially included in that area, when confirming the position of parts three-dimensionally displayed on a display screen of a CAD system or changing the shapes or positions of the parts.

2. Description of the Related Art

Recently, products have been design using computers, that is, CAD systems. These systems are being widely utilized in the manufacture of electronic equipment and machinery and the construction of buildings.

In general, CAD systems include a host computer, a color display, a work station, a printer, a keyboard, and a mouse.

When utilizing such a CAD system, it is extremely important to be able to quickly change the positions or change or correct the shapes etc. of parts attached inside a structure displayed on the display screen. This is particularly important in design divisions which deal with the mounting positions of parts. Accordingly there is a demand for higher performance on the part of CAD systems. Therefore, to achieve higher speed changes or corrections, it is necessary to quickly determine whether a part in question is completely included in the retrieval space.

SUMMARY OF THE INVENTION

The object of the present invention is to provide a retrieval space determination system for three-dimensionally shaped parts in a CAD system which enables quick determination if a part in question is completely included within a predetermined area of the display, i.e., is completely included within a retrieval space, or if the part in question is only partially included in that space, when confirming, changing, or correcting the positions of parts three-dimensionally displayed on a display screen of the CAD system.

This system for three-dimensionally shaped parts in a CAD system includes an input unit for inputting coordinates of two points defining one side of the retrieval space displayed on the display screen and inputting the depth of the retrieval space based on that side. The retrieval system additionally includes a file for storing three-dimensional shape data, and a circumscribing sphere creating unit for reading a three-dimensionally shaped part in question from the three-dimensional shape data file and creating a circumscribing sphere for the part in accordance with the coordinate data of the part. Moreover, a coordinate conversion means for converting center coordinates of the circumscribing sphere created by the circumscribing sphere creating unit into coordinates of the retrieval space input from the input unit, and an in/out decision unit for comparing the center coordinates of the circumscribing sphere converted into coordinates of the retrieval space, the radius of the circumscribing sphere, and the coordinates of the sides of the retrieval space and deciding whether the circumscribing sphere is completely included within the retrieval space or is only partially included within the retrieval space are also included.

In an embodiment of the present invention, a tablet is used as the input unit for inputting the coordinates of the side of the retrieval space and a keyboard is used as the input unit for inputting the depth of the retrieval space.

DESCRIPTION OF THE PREFERRED EMBODIMENTS

Below, preferred embodiments of the present invention will be explained with reference to the drawings. Before explaining the present invention, however, a conventional method for retrieving three-dimensionally shaped parts and problems of the method will be explained with reference to FIG. 8.

Figure 8:
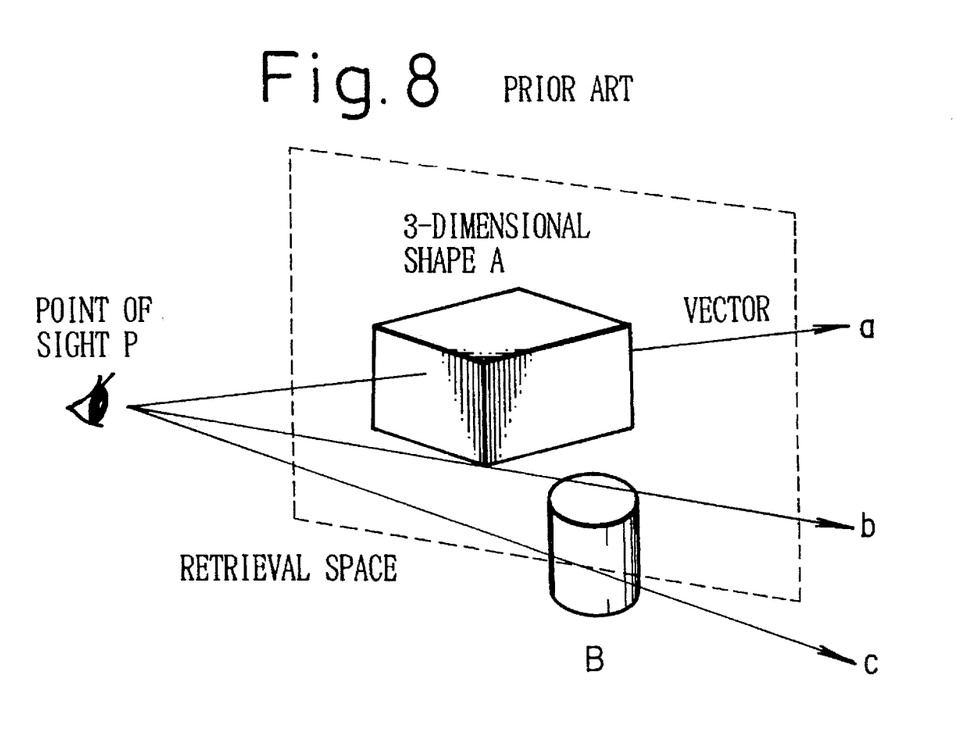
FIG. 8 is a schematic explanatory view of a retrieval system for three-dimensionally shaped parts in the prior art.

FIG. 8 is a schematic explanatory view of a retrieval system for three-dimensionally shaped parts in the prior art. As shown in the drawing, three-dimensionally shaped parts, that is, a block A and a cylinder B, are displayed on a display screen of a CAD system. To determine if these parts are completely included within the retrieval space or if they are only partially included within the space, the operator looks at the displayed image from his point of sight P and examines the parts along the lines of sight a, b, and c. As shown in the figure, the line of sight a directly crosses the part A, the line of sight b comes close to the part A and crosses the part B, and the line of sight c directly crosses the part B.

In this case, in the retrieval of three-dimensionally shaped parts by the conventional CAD system, the operator designates the retrieval space on the screen, then the CAD system performs coordinate calculation to determine whether the parts in question are included in the retrieval space or the positional relationship of parts is suitable based on the point of sight and lines of sight. More specifically, it performs coordinate calculation based on the lines of sight to determine that the part A is completely included in the retrieval space and that the part B is partially outside of the retrieval space.

The more complex the three-dimensional shape of the parts and the more numerous the parts in question, however, the more time is required for the CAD system to perform the coordinate calculations for each part.

Accordingly, the object of the present invention is to provide a system for three-dimensionally shaped parts enabling quick determination of whether a part in question is completely included within a predetermined area of the display screen, i.e., is included within the retrieval space, or if the part in question is only partially included within that space, when confirming, changing, or correcting the positions of three-dimensionally displayed parts on a display screen of a CAD system.

Figure 1:
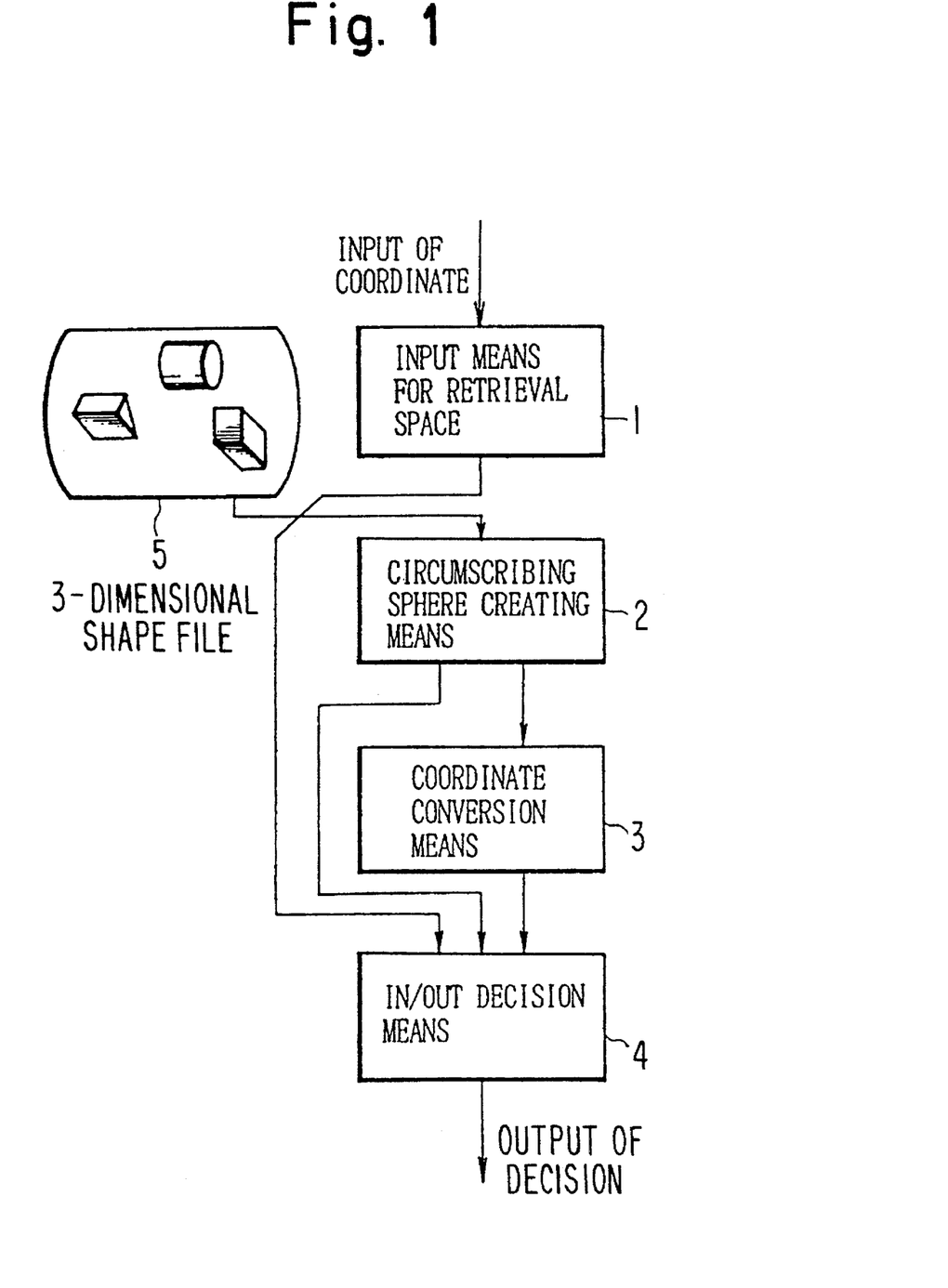
FIG. 1 is a basic structural view of a retrieval system of three-dimensionally shaped parts according to the present invention.

FIG. 1 is a basic structural view of a retrieval space determination or retrieval system of three-dimensionally shaped parts according to the present invention. The retrieval system of three-dimensionally shaped parts of the present invention includes an input unit 1 for receiving coordinates of two points defining one side of the retrieval space displayed on the display screen using a tablet and inputting the depth of the retrieval space based on that side using a keyboard. A file 5 stores three-dimensional shape data. A circumscribing sphere creating unit 2 reads a three-dimensionally shaped part in question from the three-dimensional shape data file and creates a circumscribing sphere for the part in accordance with the coordinate data of the part. A coordinate conversion unit 3 converts center coordinates of the circumscribing sphere created by the circumscribing sphere creating unit into coordinates of the retrieval space input from the input unit. An in/out decision unit 4 compares the center coordinates of the circumscribing sphere converted into coordinates of the retrieval space, the radius of the circumscribing sphere, and the coordinates of the sides of the retrieval space and decides whether the circumscribing sphere is completely included within the retrieval space or is only partially included within the retrieval space. It is possible to quickly determine if the part in question is included in the retrieval space from the output of the in/out decision unit 4.

Figure 2:
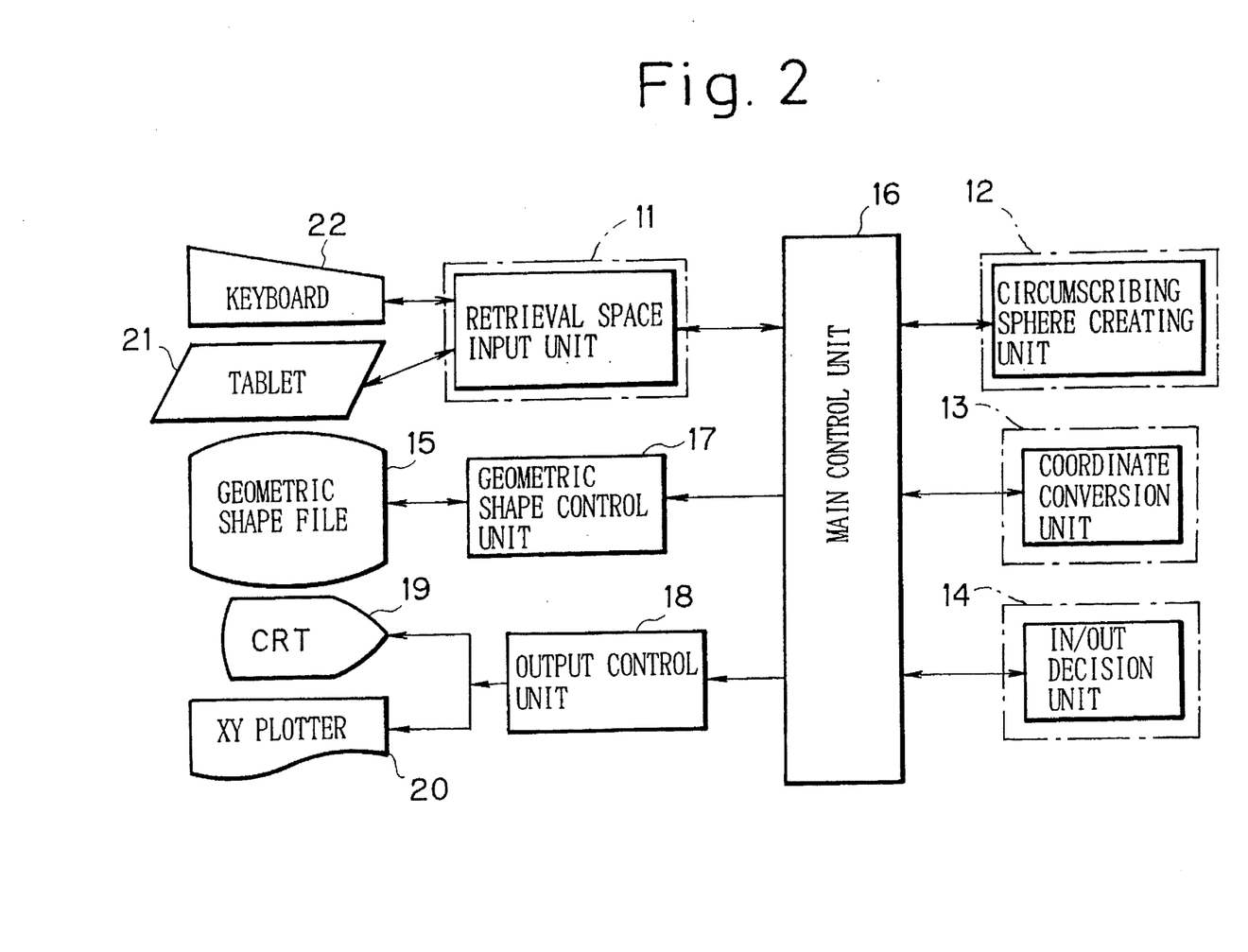
FIG. 2 is a structural view of a retrieval system for three-dimensionally shaped parts according to an embodiment of the present invention.

FIG. 2 is a structural view of a retrieval system for three-dimensionally shaped parts according to an embodiment of the present invention. In the figure, reference numeral 11 denotes a retrieval space input unit, 12 a circumscribing sphere creating unit or package, 13 a coordinate conversion unit or package, 14 an in/out decision unit or package, 15 a three-dimensional or geometric shape file or memory, 16 a main control unit, 17 a three-dimensional shape control unit, 18 an output control unit, 19 a CRT display, 20 an X-Y plotter, 21 a tablet, and 22 a keyboard. The CAD computer includes the circumscribing sphere creating package 12, coordinate conversion package 13, in/out decision unit 14, and main control unit 16.

The operator inputs coordinates of two points of one side of the desired retrieval space of the screen on the display 19 using the tablet 21 and inputs the depth of the retrieval space using the keyboard 22. The outputs of the tablet 21 and keyboard 22 are input to the retrieval space input unit 11.

The retrieval space input unit 11 creates the retrieval space based on the input coordinates of the two points of the side and the depth L and transmits the same to the main control unit 16.

The circumscribing sphere creating unit 12 generates an instruction to the main control unit 16 to read the three-dimensional shape of the already positioned part in question and creates the circumscribing sphere of the three-dimensionally shaped part is read.

The coordinate conversion unit 13 converts the center coordinates of the circumscribing sphere created by the circumscribing sphere creating unit 12 into coordinates of the retrieval space created by the retrieval space input unit 11. The coordinate conversion is easy since the correspondence between the reference coordinates of the parts stored in the three-dimensional shape file 15 and the coordinates on the display screen is already known. Therefore, if the distance between the reference coordinates of a part and the center coordinates of the circumscribing sphere is known, it is easy to convert to the coordinate system of the retrieval space.

The in/out decision unit 14 decides whether the circumscribing sphere is completely included within the retrieval space or if it is only partially included within the retrieval space based on the radius of the circumscribing sphere created by the circumscribing sphere creating unit 12, the center coordinates of the circumscribing sphere converted into coordinates of the retrieval space by the coordinate conversion unit 13, and the size of the retrieval space created by the retrieval space input unit 12.

The main control unit 16 is preferably formed by a microprocessor. The processing of the main control unit 16 is shown by the flow chart of FIG. 3.

The three-dimensional shape control unit 17 stores the geometric shape data of the part requested from the main control unit 16, into the three-dimensional shape file 15 and performs control for reading the part in question from the file.

The output control unit 18 outputs the data of the part in question, for which output was requested, to the display 19 and the X-Y plotter 20.

Figure 3:
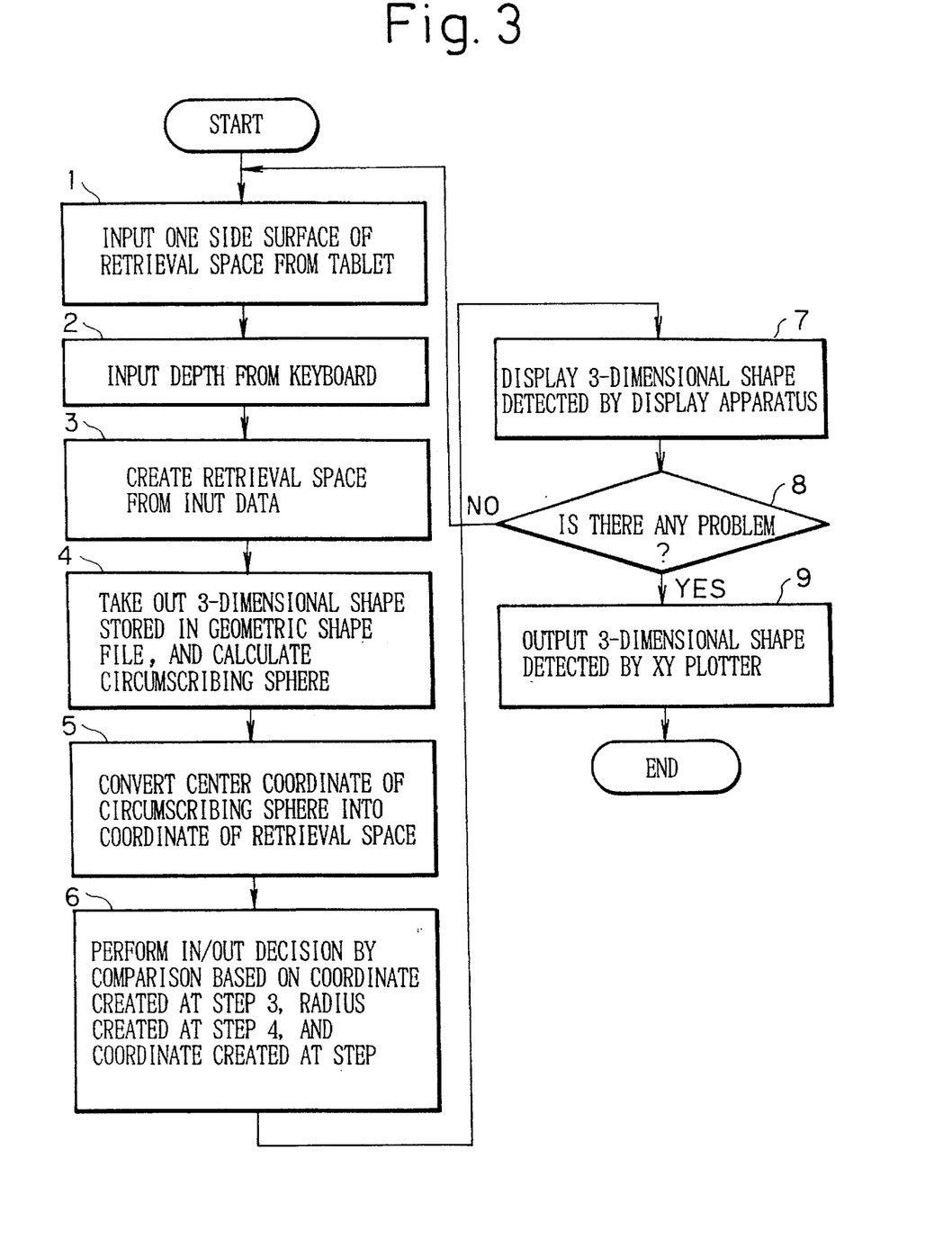
FIG. 3 is a flow chart of the operation of a retrieval system of three-dimensionally shaped parts according to the present invention.

FIG. 3 is a flow chart of the operation of a retrieval system of three-dimensionally shaped parts according to the present invention. First, the operator inputs coordinates of two points of one side of the retrieval space on the display screen using the tablet 21 (step 1) and then inputs the depth of the side using the keyboard 22 (step 2). The retrieval space input unit 11 creates the retrieval space on the display screen based on this input data (step 3).

Next, the circumscribing sphere creating unit 12 reads the data of the part in question, previously stored in the three-dimensional shape file 15, under the instruction of the main control unit 16. The circumscribing sphere creating unit then calculates the circumscribing sphere of the part in question (step 4). The coordinate conversion unit 13 converts the center coordinates of the calculated circumscribing sphere into coordinates of the retrieval space (step 5).

The in/out decision unit 14 decides whether the circumscribing sphere is completely included within the retrieval space or if it is only partially included within the space based on the radius of the circumscribing sphere, the center coordinates of the same, and the size of the retrieval space (step 6). The part in question is displayed on the display screen (step 7). After this step, the operator looks at the displayed part and decides if there is any problem (step 8). When there is no problem (YES), the part in question is displayed on the X-Y plotter (step 9). When there is a problem at step 8 (NO), the process returns to step 1.

In the above example, although a tablet and keyboard were used as the input means and a display and X-Y plotter were used as the output means, it is possible to use a mouse as an input means and a printer as an output means.

As explained above, the present invention obtains the circumscribing sphere of the part in question, converts the center coordinates of the circumscribing sphere into coordinates on the display screen, and decides whether the part in question is completely included within the retrieval space or is only partially included within the retrieval space. Accordingly, the time-consuming coordinate calculation of the part is no longer required and it is possible to make a quick and easy determination.

Figure 4:
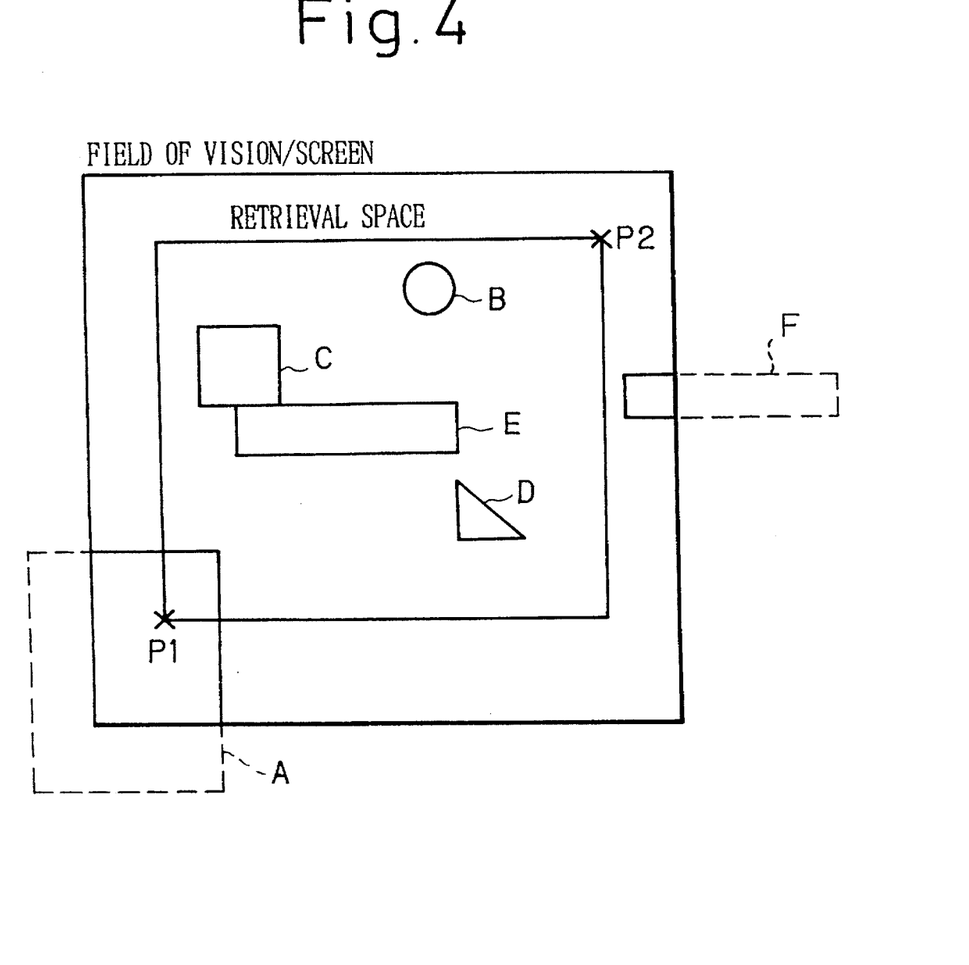
FIG. 4 is an explanatory view of a retrieval space on a display screen.
Figure 5:
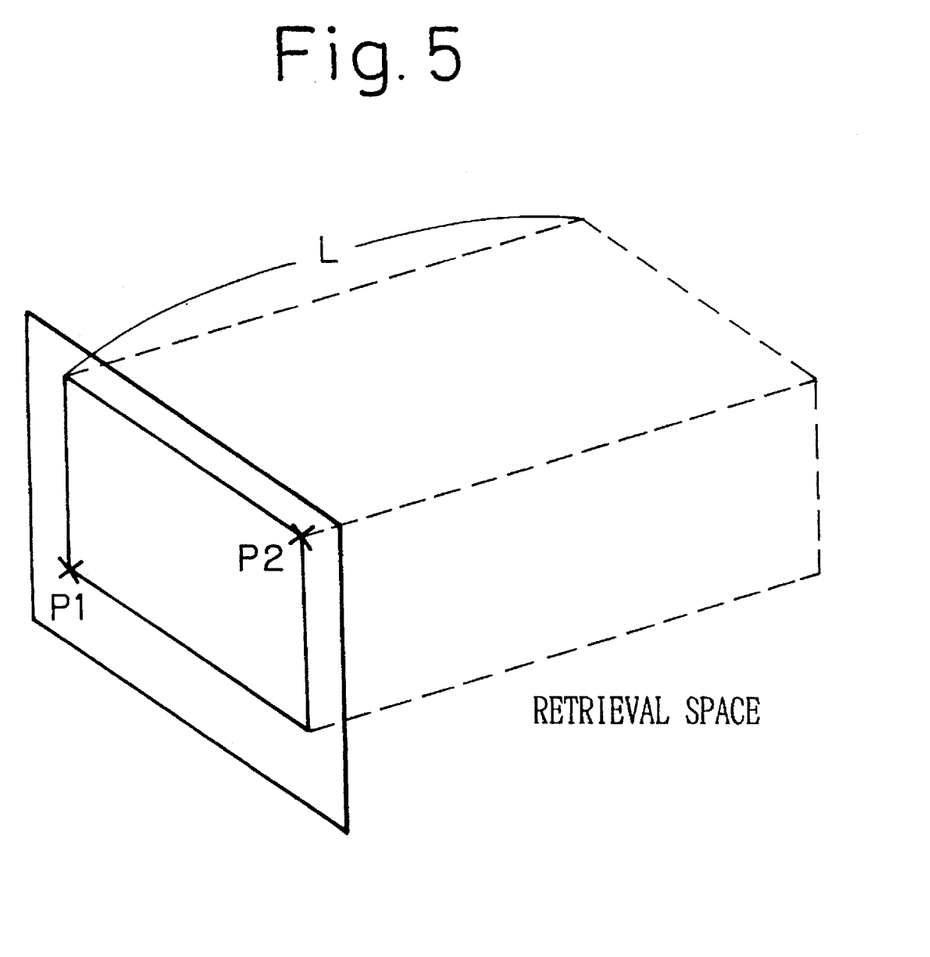
FIG. 5 is an explanatory view of a depth of a retrieval space.

FIGS. 4 and 5 are explanatory views of a retrieval space on a display screen. In the figures, A to F denote three-dimensionally shaped parts. P1 and P2 are the two points defining the side of the retrieval space. As mentioned above, the operator inputs these using a tablet or a mouse. As shown in FIG. 4, the retrieval space defined by the two points P1 and P2 completely include the parts B to E, partially include the part A, and completely excludes the part F. As shown in FIG. 5, the depth L of the side defined by P1 and P2 is input by the operator from a keyboard.

Figure 6:
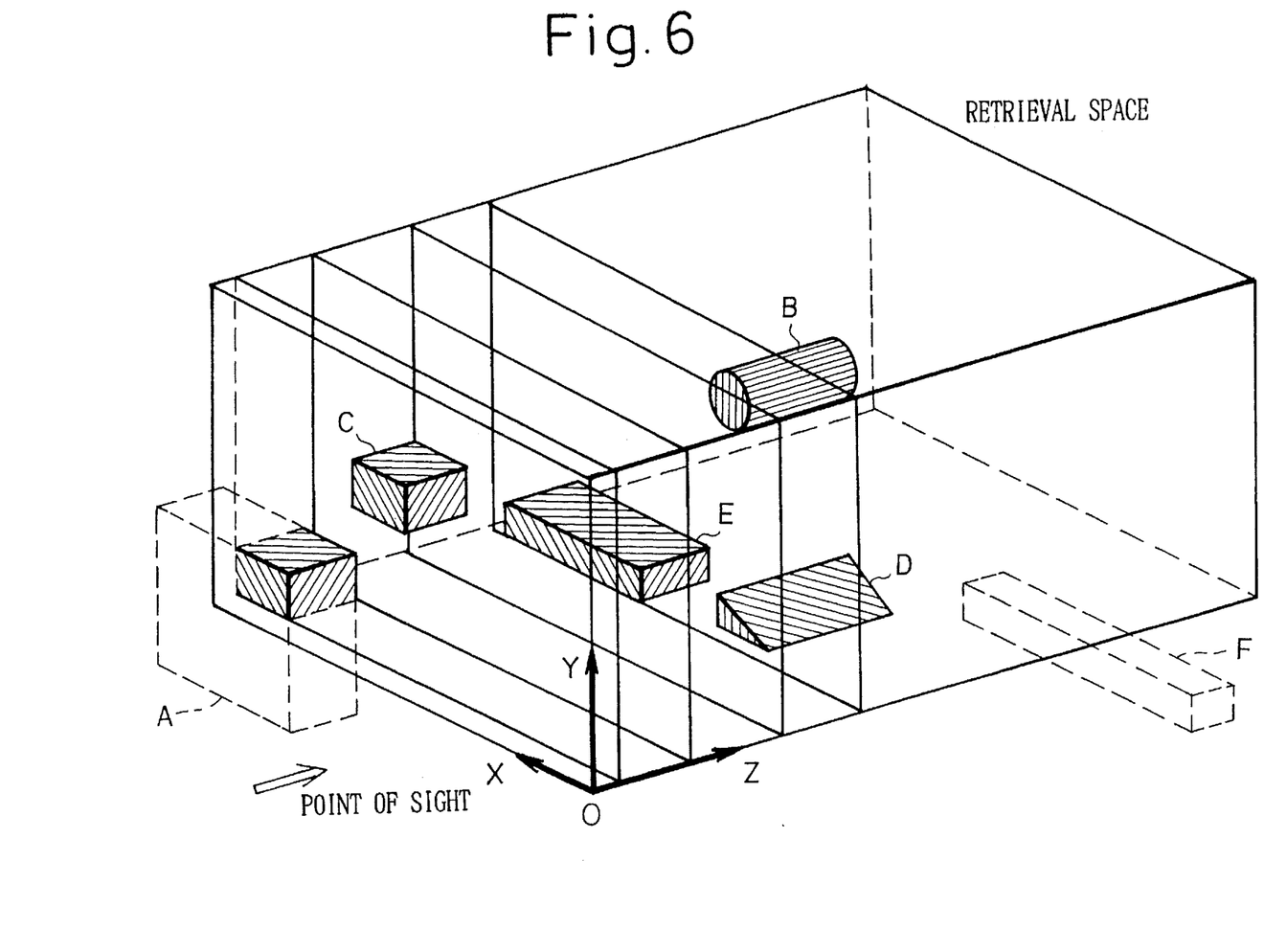
FIG. 6 is a detailed explanatory view of the positions of parts in a retrieval space.

FIG. 6 is a detailed explanatory view of FIGS. 4 and 5. As mentioned before, the parts B to E are completely included within the retrieval space, the part A is partially included at the hatched part, and the part F shown by the dotted lines is completely excluded. If the center point of the X-Y-Z coordinate system of the retrieval space is set as the reference coordinates 0,0,0 then it is possible to easily convert the center coordinates of the circumscribing sphere of the parts into coordinates of the retrieval space.

FIGS. 7A to 7F are explanatory views of circumscribing spheres of the parts. In the figures, A' to F' denote the center coordinates of the circumscribing spheres. The correspondence of the X-Y-Z coordinates of the parts with the X-Y-Z coordinate system of the retrieval space is already known. Therefore, it is possible to easily convert the center coordinates A' to F' of the circumscribing spheres into coordinates of the retrieval space.

Figure 7A:
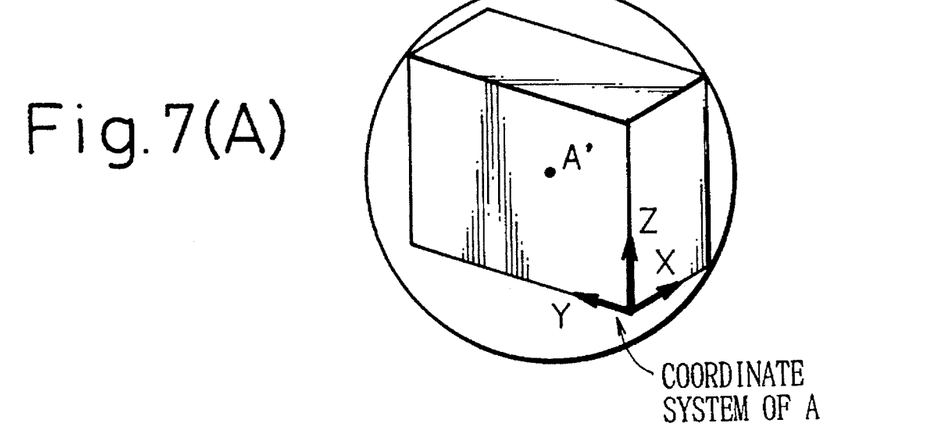
FIG. 7A to FIG. 7F are explanatory views of circumscribing spheres of parts.
Figure 7B:
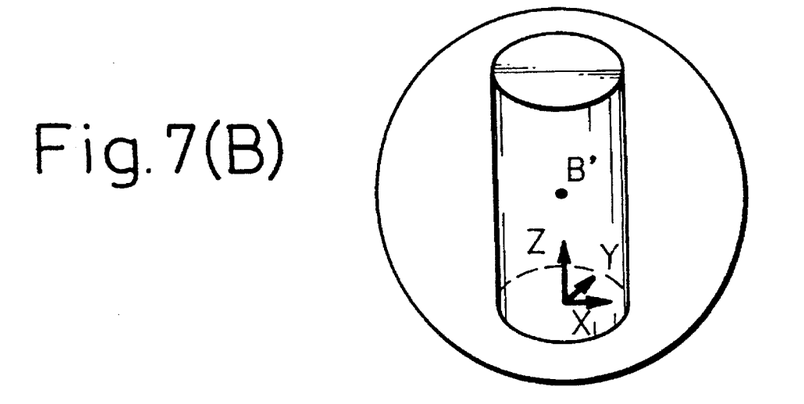
Figure 7C:
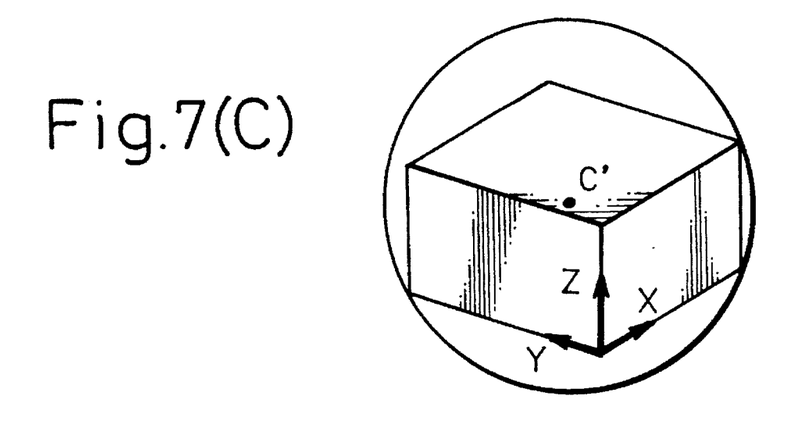
Figure 7D:
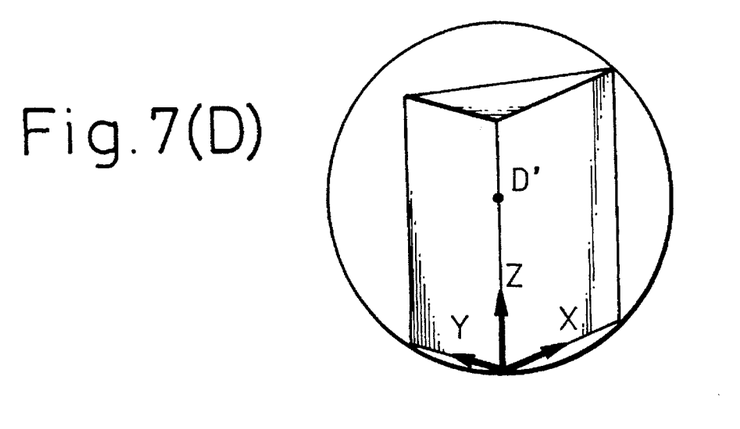
Figure 7E:
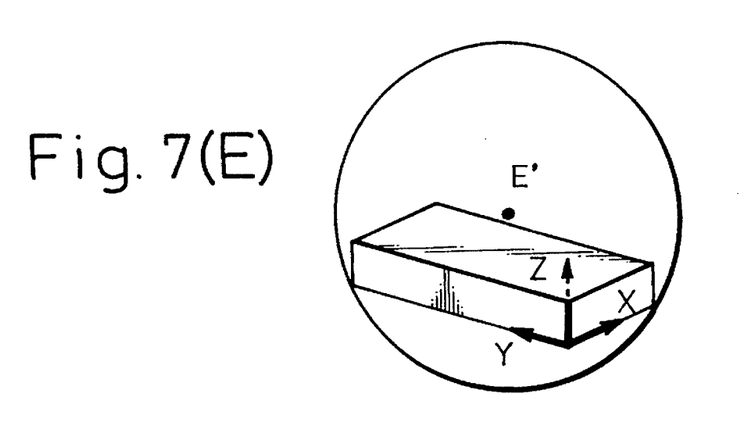
Figure 7F:
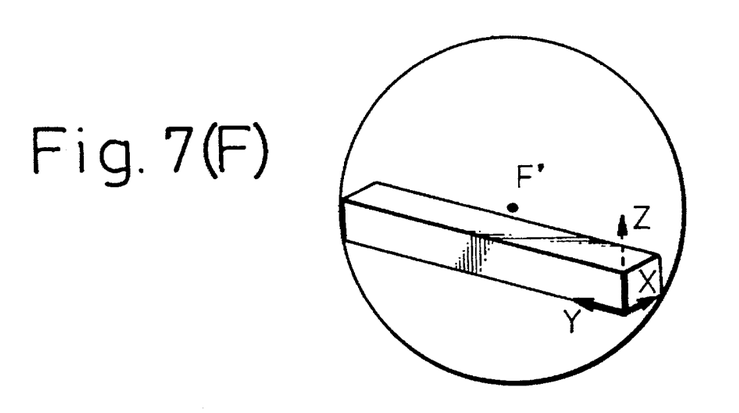

For example, in FIG. 7A, the center coordinates A' can be easily expressed by the X-Y-Z coordinates of the block. On the other hand, the correspondence of the coordinates of the block with the X-Y-Z coordinates of the retrieval space shown in FIG. 6 are already known, so it is easy to convert the center coordinates A' to the coordinate system of the retrieval space in the coordinate conversion unit.

I claim:

1. A retrieval space determination system for three-dimensionally shaped parts in a CAD system, comprising:

input unit inputting coordinates of two points defining one side of a retrieval space, having sides and being a three-dimensional polygon, displayed on a display screen, and inputting a depth of the retrieval space with respect to the one side;

memory storing three-dimensional shape data; and a computer, comprising a circumscribing sphere creating means for reading three-dimensional shape data corresponding to a selected three-dimensionally shaped part from the three-dimensional shape data stored in the file, and creating a circumscribing sphere for the selected three-dimensionally shaped part, the circumscribing sphere having center coordinates and a radius;

coordinate conversion means for converting the center coordinates of the circumscribing sphere created by the circumscribing sphere creating unit into coordinates of the retrieval space input to the input means; and in/out decision means for comparing the center coordinates of the circumscribing sphere converted into coordinates of the retrieval space, the radius of the circumscribing sphere created by the circumscribing sphere creating unit, and the coordinates of the one side and depth of the retrieval space and deciding whether the circumscribing sphere is completely included within the retrieval space or is only partially included within the retrieval space.

2. A retrieval system for three-dimensionally shaped parts as set forth in claim 1, wherein the input unit includes a tablet for inputting the coordinates of the side of the retrieval space and a keyboard for inputting the depth of the retrieval space.

* * * * *

UNITED STATES PATENT AND TRADEMARK OFFICE
CERTIFICATE OF CORRECTION

PATENT NO. : 5,471,569
DATED : Nov. 28, 1995
INVENTOR(S) : KATOH

It is certified that error appears in the above-indentified patent and that said Letters Patent is hereby corrected as shown below:

Col. 3, line 67, delete "is".

Signed and Sealed this

Twenty-eighth Day of May, 1996

Attest:

BRUCE LEHMAN

*Attesting Officer*     *Commissioner of Patents and Trademarks*